United States Patent
Bauman et al.

(10) Patent No.: US 6,267,998 B1
(45) Date of Patent: *Jul. 31, 2001

(54) MULTI-LAYER TOASTER PRODUCT AND METHOD FOR MAKING SAME

(75) Inventors: Michael Bauman, Battle Creek, MI (US); Mark Steven Lippi, Elmhurst, IL (US); Nancy Ann Esterline, Battle Creek, MI (US); Rosemary Julia Sikora, Buffalo Grove; Glenn Roy Quinlan, Glendale Heights, both of IL (US); Hillis O. Kauffman, Battle Creek; Harold G. Gobble, Richland, both of MI (US)

(73) Assignees: Kellogg Company of W. K. Kellogg Institute, Battle Creek, MI (US); Keebler Company, Elmhurst, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,562

(22) Filed: Apr. 2, 1999

Related U.S. Application Data

(60) Provisional application No. 60/080,653, filed on Apr. 3, 1998.

(51) Int. Cl.[7] .................................................... A21D 2/00
(52) U.S. Cl. ........................... 426/94; 426/272; 426/275; 426/502; 426/517; 426/556; 426/559
(58) Field of Search .................................. 426/249, 272, 426/275, 94, 502, 503, 517, 557, 556, 549, 559

(56) References Cited

U.S. PATENT DOCUMENTS

| | | | |
|---|---|---|---|
| 4,612,198 | 9/1986 | Wallin et al. | 426/94 |
| 4,618,498 | 10/1986 | Thulin | 426/275 |
| 4,623,542 | 11/1986 | Wallin et al. | 426/94 |
| 4,761,290 | 8/1988 | Meraj et al. | 426/90 |
| 5,405,626 | 4/1995 | Van Der Graaf et al. | 426/94 |
| 5,514,397 | 5/1996 | Shapiro | 426/249 |

FOREIGN PATENT DOCUMENTS

| | | | |
|---|---|---|---|
| 2414177A1 | 9/1975 | (DE) | A21D/13/08 |
| 9108671 | 6/1991 | (WO) | A21D/8/06 |
| 9944428 | 9/1999 | (WO) . | |

*Primary Examiner*—Milton Cano
*Assistant Examiner*—Hao Mai
(74) *Attorney, Agent, or Firm*—Howard & Howard

(57) ABSTRACT

A fully baked or fried multi-layered toaster product comprises a first layer and a second layer wherein the first and second layers are constructed of dissimilar materials. The first layer provides the structural properties required for a toaster product while the second layer provides enhanced characteristics such as taste, texture, and other organoleptic properties. The multi-layered toaster product contains dissimilar dough or batter types and can further include filling and/or particulates and/or toppings.

20 Claims, 1 Drawing Sheet

MULTI-LAYER TOASTER PRODUCT AND METHOD FOR MAKING SAME

This application claims the benefit of U.S. Provisional Application Ser. No. 60/080,653, filed on Apr. 3, 1998.

The present invention relates to an improved toaster product. More specifically, the present invention relates to an improved multi-layer toaster product having at least two dissimilar layers of dough.

Currently, toaster pastry technology only utilizes sheeted dough components. A typical example of the current toaster pastry technology is the KELLOGG's® POP-TARTs®. The POP-TART® toaster pastry utilizes a sheeted dough to form a bottom, structural layer onto which a filling is disposed. An additional layer of the sheeted dough is applied over the intermediate filling layer and is affixed to the bottom structural dough layer. Consequently, toaster products have been limited to those products which consist of only a layer or layers of structural sheeted dough or to products which include a dough shell surrounding and encasing a flavored filling material such as that disclosed in U.S. Pat. Nos. 4,612,198 and 4,623,542 both issued to Wallin et al., and assigned to the Pillsbury Company.

Many of the problems associated with the development of toaster products stem from the criteria or standards applied to toaster products in order to maintain uniformity and allow the products to be used in most standard vertical toasters. For example, certain physical requirements such as the dimension of the toaster product must be such that a user is not required to reach into the toaster to remove the toaster product. The weight of the toaster product must be below a prescribed maximum weight so that a toaster mechanism is able to raise the toaster product from the toasting area of the toaster. The thickness of the toaster product must be kept below approximately ¾" so that it is below the minimum standard opening size of a toaster. The product must have sufficient structural integrity so as to not distort in shape while in the toaster. The product must also be structurally capable of being removed from the toaster intact and must not leak any of its contents into the toaster. A product that is too fragile will be difficult to remove from a toaster. A fragile product can fall apart as it is being removed from a toaster. For example, cookies soften when heated becoming too fragile to remove intact from a toaster. Additionally, it is desirable that the structural layer of the toaster product be able to dissipate heat quickly such that it can be handled by a user without causing undue discomfort to or burning of the user. This list of requirements for toaster products which are to be heated in a vertical toaster is not meant to be an exhaustive list of all of the criteria which must be met by all toaster products but are, however, illustrative of the difficulties which are encountered in the development of novel toaster products. Many of these criteria and standards are dictated in order to maintain uniformity among toaster products so that they can be used universally in most standard commercially available-vertical toasters.

It has long been desired to have a toaster product which possesses the characteristics of freshly baked cookies, cakes or desserts such as better taste and texture attributable to higher fat and/or sweetener and/or moisture containing doughs; however, several problems have hampered efforts in these areas. Typically, non-structural doughs, such as cookie dough, by themselves do not provide a product which is suitable for use in a vertical toaster. Typically, non-structural doughs are higher in fat, and/or sweetener, and/or moisture which makes these types of doughs more fragile than current sheeted pastry dough. Thus, a sheeted or extruded non-structural dough is unsuitable for use as a toaster product. Previous attempts to produce a sheeted or extruded cookie dough have failed to produce a toaster product which resists distorting and breaking during toasting, breaking during removal from the toaster and which overcome the deficiencies in other structural areas which make utilization of these doughs in toaster pastries difficult, if not impossible.

As stated above, previous toaster products have been constructed of a sheeted, structural dough having flavored intermediate layers or toppings disposed either therein or thereon, respectively. However, it would be desirable to have a toaster product in which a layer of non-structural or dissimilar dough or batter component having enhanced organoleptic properties is combined with a sheeted dough to provide a product having improved taste and texture characteristics that yield a toaster product which is more like a freshly based cookie, cake, and/or dessert and which is suitable for use in a vertical toaster.

SUMMARY OF THE INVENTION

A multi-layer toaster product is disclosed having a first layer and a second layer wherein the first layer and the second layer are made from dissimilar materials. Preferably, the first layer includes a structural, sheeted pastry dough and the second layer includes a non-structural layer possessing enhanced flavor, texture, and organoleptic properties. The invention also includes the use of a filling or frosting layer either between the dissimilar layers, disposed on one layer, or both.

There is also disclosed a method for making a multi-layered toaster product which includes the steps of providing a first layer of structural dough; disposing a second, dissimilar non-structural layer over the first structural dough layer; and, binding together the first layer and the second layer. The method also includes the steps of providing a filling or frosting layer disposed on one layer or both.

BRIEF DESCRIPTION OF THE DRAWINGS

Other advantages of the present invention will be readily appreciated as the same become better understood by reference to the following detailed description when considered in connection with the accompanying drawings wherein.

DETAILED DESCRIPTION OF THE INVENTION

Figure 1:
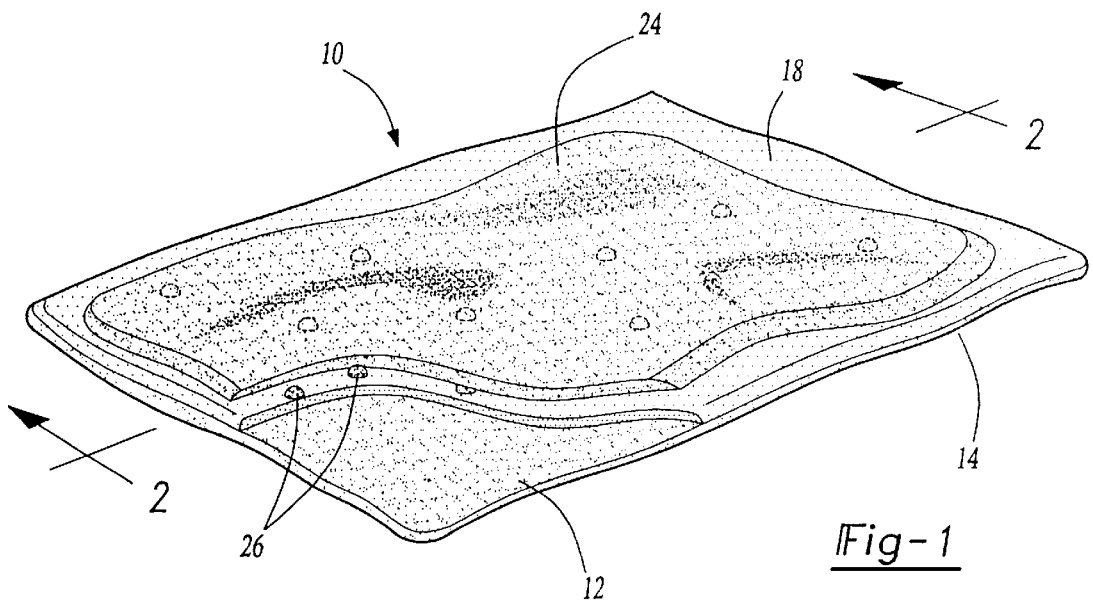
FIG. 1 is a top perspective view of a multi-layer toaster product in accordance with the present invention.
Figure 2:
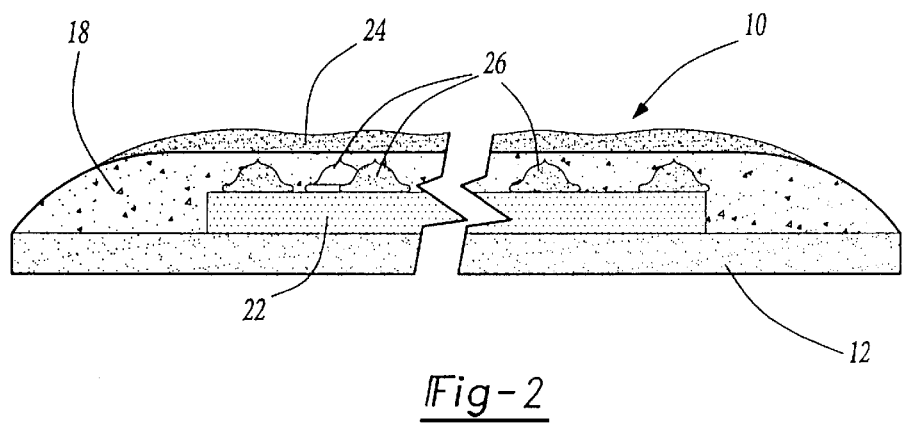
FIG. 2 is a cross-sectional view of the multi-layer toaster product taken along line 2—2 of FIG. 1.
Figure 3:
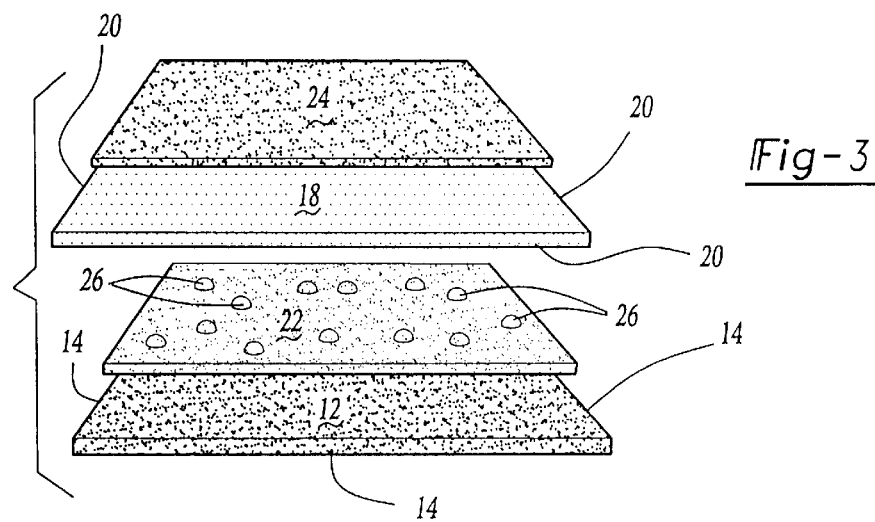
FIG. 3 is an exploded view of the multi-layer toaster product in accordance with the present invention.

Referring to the Figures, the present invention is a multi-layer toaster product, generally indicated by the numeral 10, suitable for use in a vertical toaster. The toaster product includes at least a first layer 12 and a second layer 18 which are preferably dissimilar in formula and/or processing methodology. The material or dough which comprises the first layer 12 preferably imparts structural characteristics to the toaster product. The second layer 18, which is typically disposed on the first layer 12, preferably imparts taste, texture and other organoleptic properties to the toaster product.

The first or structural layer 12 preferably comprises a sheeted pastry dough such as that utilized in the KELLOGGs® POP-TART® as well as other sheeted pastry doughs which are known to those skilled in the art. In addition, the first layer 12 can be constructed of other structurally suitable and, hence, toaster suitable materials such as bread or bagel dough, pizza crust, pita bread, crackers, graham cracker, pie crust, puff pastry and the like. The dough comprising the first layer 12 must have suitable structural characteristics to resist breaking and/or distorting during manufacturing, packaging, shipping, and final toasting during consumer use. The first layer 12 must be strong enough to support the second layer 18 and to support any filling layer. Layer 12 must withstand the heating process in the toaster as it sits in the toaster on its edge. It must also be strong enough to support itself, the second layer 18 and the filling layer as the multi-layer product is held at an edge as it is removed from the toaster.

The second, non-structural layer 18 or "taste good" layer imparts characteristics and properties such as taste, texture, aroma, and other organoleptic properties that are associated with products that have heretofore been unsuitable for toasting in a vertical toaster. Preferably, the second layer 18 is constructed of a dough which provides a different mouthfeel when eaten and can be extruded, pumped, or otherwise deposited during manufacture. For example, the second layer 18 can have the characteristics of a cookie, a brownie, a cake, a pancake, a waffle, or a puff pastry. A cookie dough suitable for use as the second dough layer 18 in the present invention can include, but is not limited to, cookie types such as sugar cookies, oatmeal cookies, or chocolate chip cookies. Batter-type doughs can include, for example, corn bread batter, waffle batter, pancake batter, or a cake batter. Other doughs include a crumb top-type dough such as apple strudel or pecan crumb, and/or puff pastries. The second layer 18 is preferably extruded, pumped or deposited dough, batter or streusel. In general, the ingredients which make up the second layer 18 are higher in fat and/or sweetener such as sugar, and/or moisture content than the dough used for the first layer. However, low-fat alternatives can be substituted without departing from the spirit of the invention. Other types of non-structural second layers are contemplated and include those dough or batter products which are traditionally non-structural in nature. The resultant multi-layer toaster pastry 10 is capable of fulfilling the requirements for toaster products discussed above.

Additional layers 22, 24 can be disposed in between the second layer 18 and the first layer 12 or on top of the second layer. The multi-layer toaster pastry 10 according to the present invention can include layers of fillings, particulates, or both of any flavor, sweetness, texture, or color if so desired for the product. Sweet fillings include, but are not limited to, fruit, e.g., strawberry, blueberry, peach, apricot, apple, boysenberry, mango, cherry, mixtures thereof and confectionery fillings including brown sugar, cinnamon and vanilla cream, and chocolate fillings, e.g., milk chocolate and semi-sweet chocolate fillings. Non-sweet fillings include, but are not limited to, nuts, cheeses, meats, and vegetables. The filling 22 can be disposed as a dispersion or patty.

The additional layers can further comprise a layer of particulate matter 26 such as, but not limited to, chocolate chips, fruits, various forms of dried fruits, fruit analogs, confectionery pieces, nuts nut analogs, cheeses, vegetable meats, herbs, sauces, savory fillings, and dough baked crumbles.

Toppings 24 can include, for example, streusel, candy pieces, candy, nuts, grains, and confectionery pieces and/or icings or frostings, and/or meringues. The toppings 24 can be disposed both prior to baking or frying and/or after baking or frying the multi-layer toaster product 10. It is to be understood that other fillings 22 or toppings 24 not specifically disclosed herein can be used without departing from the spirit of the invention.

The multi-layer toaster product 10, according to the present invention, can include particulates and/or icing or can be comprised of only the second 18 and first 12 layers of doughs. By combining the structural first layer 12 with the second layer 18 of non-structural material, products such as toaster cookies, toaster brownies, etc., can be achieved. These products were previously unavailable as toaster products.

Additional ingredients such as colorings and flavorings that are well known in the art can be added to modify the color and/or flavor of the second 18 and/or first 12 layers and/or fillings and toppings. The terms flavorings and colorings refer to any natural or synthetic material known to those skilled in the art that are suitable for imparting flavor or color to food products.

The multi-layer toaster product 10 of the present invention can be made by first forming a continuous layer of structural sheeted dough suitable for the first layer 12. The sheeted dough can be reduced by successive passes through a rolling apparatus. The continuous layer of sheeted dough can include margins 14 if a filling 22 is disposed between the layers which will later receive and bond to margins 20 of the dissimilar, non-structural second layer 18. The second, non-structural layer 18 is then disposed over the first structural layer 12.

The method can further include the stop of binding together, if necessary, the margins 14, 20 of both the first, structural layer 12 and the second, non-structural layer 18. Preferably, the binding of the first 12 and the second 18 layers is accomplished by crimping, rolling, or stamping techniques well known to those skilled in the art.

The method can further include the step of disposing an intermediate, non-dough layer or layers on between the first 12 and second 18 layers. The intermediate, non-dough layer can include fillings 22 and/or particulate matter 26 such as those discussed above. Additionally, a layer of non-dough material 24, such as icing, streusel, candy pieces, candy, nuts, grains, meringues, and/or confectioneries can be disposed on top of the non-structural second layer 18, both prior to baking or frying and/or after baking or frying.

Typically, the first structural layer 12 is formed by successively reducing a sheeted pastry dough to a desired thickness. Alternatively, the first 12 layer can be disposed using extrusion technology known to those skilled in the art.

Preferably, the second, non-structural layer 18 is disposed onto the structural sheeted dough utilizing low pressure extrusion technology, pumping or other depositing systems known to those skilled in the art.

Prior to disposing the second layer 18 onto the first layer 12, the margins or edges 14 of the first layer 12 can be prepared to receive the second layer 18 by disposing a binding agent such as water, starch "glue," or other binder "glue" on its margins 14. The binding agent is preferably sprayed onto the margins or edges 14 of the first layer 12. The binding agent disposed on the margins 14 aides in the formation of a peripheral seal between the first 12 and second 18 layers which is capable of retaining any filling 22 material therein. The formation of a leak-proof seal between the second 18 and first 12 layers is essential in the manufacture of a suitable toaster product.

The additional layer or layers of filling 22 and/or particulate matter 26 disposed on the first layer 12 are preferably spaced away from the edges of margins 14 of the first layer 12. This is necessary in order to prevent filling 22 and/or particulate matter 26 from being disposed within the region of the toaster pastry which forms the peripheral seal. Should filling 22 or particulate matter 26 be disposed within the seal between the second 18 and the first 12 layers, the potential for leakage of the contents of the toaster pastry is increased. Accordingly, the filling 22 and/or particulate matter 26 must be carefully disposed onto the first layer 12 such that a zone which is free of both filling 22 and/or particulate matter 26 is established. This zone will later be mated to the second layer 18 and a leak-free seal formed therebetween. The particulate matter 26 can be disposed in any suitable pattern.

The completed multi-layer toaster product 10 is then baked or fried at an appropriate temperature and is then cooled and packaged. The resultant multi-layered toaster product 10 can be stored, distributed, and sold in a shelf-stable, refrigerated or frozen format.

The completed product has a structural integrity that provides a tender texture that withstands heating such that the multiple layers do not separate and the product does not break into pieces after heating. The structural integrity of the product is such that it can be held by hand without breaking. The product has a pleasing taste and mouth-feel before and after eating. After toasting, the products organoleptic properties are similar to a fresh baked cookie, cake or dessert.

The following example is illustrative of the present invention and is not intended to limit the invention.

EXAMPLE

Formation for a Bottom Layer: A Sheeted Dough—Target weight of the dough piece is approximately 15–25 grams for a preferred product having width dimensions of approximately 2.5–3.5", length of approximately 3.5–4.5" and thickness of approximately 1/16–1/4"

| Ingredients | Percentage |
| --- | --- |
| Shortening | 5–20 |
| Liquid Syrup | 0–12 |
| Sugar | 2–10 |
| Salt | 0.2–1.2 |
| Water | 12–18 |
| Wheat Flour | 50–60 |
| Baking Powder | 0.2–0.5 |

Additional additives known to those skilled in the art, such as flavorings, emulsifiers, stabilizers, preservatives, gums, vitamins, minerals, colors, etc., can also be added to the formulations without departing from the invention.

The ingredients are mixed in a mixer of low shear and low r.p.m.'s. The mixer style can be a single arm style, double arm style, or any of a variety of styles that will incorporate the ingredients thoroughly.

The dough is typically allowed to rest so that there could be some relaxation of the dough's structure. Next, the dough is forced between corrugated feed rolls to form a thick slab of dough. The dough slab is then conveyed through a series of smooth surface reduction rolls to achieve a desired final thickness that is within product specification.

This bottom dough sheet or first layer 12 is where a filling and/or food particulate would be deposited after the desired thickness of the bottom dough sheet is achieved.

Formation for a Top Layer: An Extruded Dough—Target weight of dough piece is approximately 15–25 grams, for a preferred product having width dimensions of approximately 2.5–3.5", length of approximately 3.5–4.5", and a thickness of approximately 1/16–1/4."

| Ingredients | Percentage |
| --- | --- |
| Shortening | 10–30 |
| Sugar | 10–25 |
| Salt | 0.2–12. |
| Water | 5–10 |
| Wheat Flour | 45–60 |
| Baking Powder | 0.5–1.0 |
| Dry Whey | 0.2–2.0 |

Additional additives known to those skilled in the art, such as flavoring, emulsifiers, stabilizers, preservatives, gums, vitamins, minerals, colors, etc., can also be added to the formulations without departing from the spirit of the invention.

The extruded, pumped or otherwise deposited dough which forms the top or second layer 18 of the toaster pastry is prepared by mixing the ingredients listed in the formation for the top extruded dough. The dough is also mixed in a low shear/low r.p.m. mixer, such as a cookie dough mixer, or the like.

The dough is then conveyed to an extrusion head of a low pressure extruder. This dough is then pushed through a slotted nozzle to form a thin sheet slightly wider than that of the bottom sheeted dough. The dough sheet is then deposited over the bottom sheet.

The multiple layers are then cut into a particular shape and then transferred to an oven to bake or fryer to be fried.

Formulation for Filling: Chocolate Flavored—Target weight of filling patty is approximately 14–24 grams.

| Ingredients | Percentage |
| --- | --- |
| Sugar | 2–18 |
| Liquid Syrup | 20–45 |
| Water | 8–12 |
| Shortening | 2–10 |
| Food Starch | 2–6 |
| Dextrose | 22–35 |
| Cocoa | 2–10 |
| Flavor | 0–2 |

Particulates: Chocolate Chips—Target weight of approximately 6–12 grams.

The above ingredients are mixed together in a manner known to one of ordinary skill in the art. The mixture is then extruded and is preferably formed into patties for depositing upon the bottom layer first layer 12. Once deposited, the top or second layer 18 is then deposited over the filling patty and the bottom or first layer 18. It should be appreciated that the filling could be extruded or otherwise formed into a sheet and deposited over the first layer 12 with the second layer 18 deposited over them.

Once the layers are deposited, they can be cut into desired shapes and baked or fried, then packaged.

A preferred embodiment of this invention has been disclosed; however, one of ordinary skill in the art would recognize that certain modifications would come within the scope of this invention. For that reason, the following claims should be studied in order to determine the true scope and content of this invention.

What is claimed is:

1. A multi-layer toaster product comprising:
   a first layer comprising a single homogeneous layer of a structural dough selected from the group consisting essentially of a bread dough, a bagel dough, a pizza crust dough, a pita bread dough, a cracker dough, a graham cracker dough, a pie crust dough, and a sheeted pastry dough, and said first layer having a plurality of peripheral margins and a sugar content of from 2.0 to 10.0% by weight;
   a second layer comprising a single homogeneous layer of a non-structural dough having a composition other than a composition of said first layer and being selected from the group consisting essentially of a cookie dough, a batter dough, and a crumb-top dough, said second layer having a plurality of peripheral margins and a sugar content that is greater that said sugar content of said first layer, said sugar content of said second layer being from 10 to 25% by weight;
   a non-dough filling layer disposed between said first layer and said second layer;
   a binding agent binding said plurality of peripheral margins of said first layer to said plurality of peripheral margins of said second layer to form a leak-proof seal between said first and said second layers; and
   said multi-layer toaster product being dimensioned to be receivable in a vertical toaster for reheating and said first layer having sufficient structural strength to rigidly support said multi-layer toaster product in the vertical toaster during the reheating and to maintain the structural integrity of said multi-layer toaster product after the reheating.

2. A multi-layer toaster product as recited in claim 1 wherein said batter dough comprises one of a brownie batter dough, a cornbread batter dough, a pancake batter dough, a cake batter, and a waffle batter.

3. A multi-layer toaster product as recited in claim 1 wherein said first layer has a shortening content of from 5 to 20% by weight and said second layer has a shortening content greater than said shortening content of said first layer, said second layer having a shortening content of from 10 to 30% by weight.

4. A multi-layered toaster product according to claim 1 wherein said filling layer is selected from the group consisting essentially of fruit fillings, chocolate fillings, confectionery fillings, and non-sweet fillings.

5. A multi-layered toaster product according to claim 4, wherein said fruit fillings are selected from the group consisting essentially of strawberry, apple, cherry, pineapple, orange, raspberry, apricot, grape, blueberry, peach, lemon, mango, and blends thereof.

6. A multi-layered toaster product according to claim 4 wherein said confectionery fillings include Carmel, chocolate, brown sugar, cinnamon and vanilla cream.

7. A multi-layered toaster product according to claim 4 wherein said non-sweet fillings are selected from the group consisting essentially of nuts, nut analogs, cheese, cheese analogs, meats, meat analogs, vegetables and seasonings.

8. A multi-layered toaster product according to claim 1 wherein said filling layer comprises particulate matter.

9. A multi-layered toaster product according to claim 8 wherein said particulate matter is selected from the group consisting essentially of chocolate chips, fruits, dried fruit forms, fruit analogs, confectionery pieces, nuts, nut analogs, cheese, vegetables meats, herbs, and baked crumble.

10. A multi-layered toaster product according to claim 1 wherein a topping is disposed on said second layer.

11. A multi-layered toaster product according to claim 10 wherein said topping is selected from the group consisting essentially of streusel, candy pieces, candy, nuts, grains and confectionery icing, frosting, meringues and/or pieces.

12. A method of forming a multi-layer toaster product comprising the steps of:
    forming a uniform structural first dough selected from the group consisting essentially of a bread dough, a bagel dough, a pizza crust dough, a pita bread dough, a cracker dough, a graham cracker dough, a pie crust dough, and a sheeted pastry dough, said first dough having a sugar content of from 2.0 to 10.0% by weight;
    forming a uniform non-structural second dough having a composition other than a composition of said first dough and being selected from the group consisting essentially of a cookie dough, a batter dough, and a crumb-top dough, said second dough having a sugar content that is greater that said sugar content of said first dough with said sugar content of said second dough being from 10 to 25% by weight
    forming a single continuous first layer with said structural first dough;
    depositing said second dough as a single continuous second layer over said first layer to form a multi-layer toaster product; and
    cooking said multi-layer toaster product by baking or frying.

13. A method as recited in claim 12 further comprising the step of depositing a non-dough filling layer between said first layer and said second layer.

14. A method as recited in claim 13 further comprising the step of binding said first layer to said second layer to seal said non-dough filling layer between said first layer and said second layer.

15. A method as recited in claim 13 further comprising the step of depositing a non-dough filling layer selected from the group consisting essentially of fruit fillings, chocolate fillings, confectionery fillings and non-sweet fillings between said first layer and said second layer.

16. A method as recited in claim 13 further comprising the step of depositing a non-dough filling layer of a particulate material between said first layer and said second layer.

17. A method as recited in claim 16 further comprising the step of depositing a non-dough filling layer of said particulate material selected from the group consisting essentially of chocolate chips, fruits, dried fruit forms, fruit analogs, confectionery pieces, nuts, nut analogs, cheese, vegetables, meat, herbs, and baked crumble.

18. A method as recited in claim 12 further comprising the step of depositing a non-dough topping layer over said second layer, thereby forming said multi-layer toaster product.

19. A method as recited in claim 18 further comprising selecting said non-dough topping layer from the group consisting essentially of streusel, candy pieces, candy, nuts, grains, confectionery icing, frosting, meringues, and pieces.

20. A method as recited in claim 12 further comprising the step of depositing said single continuous second layer comprising said second dough over said first layer to form said multi-layer toaster product by either extruding or pumping said second dough onto said first layer.

* * * * *